Dec. 10, 1963
G. BAKER
3,113,484
APPARATUS FOR PRODUCING PANORAMIC AND PANORAMIC STEREOSCOPIC IMAGES
Filed July 29, 1963
3 Sheets-Sheet 1
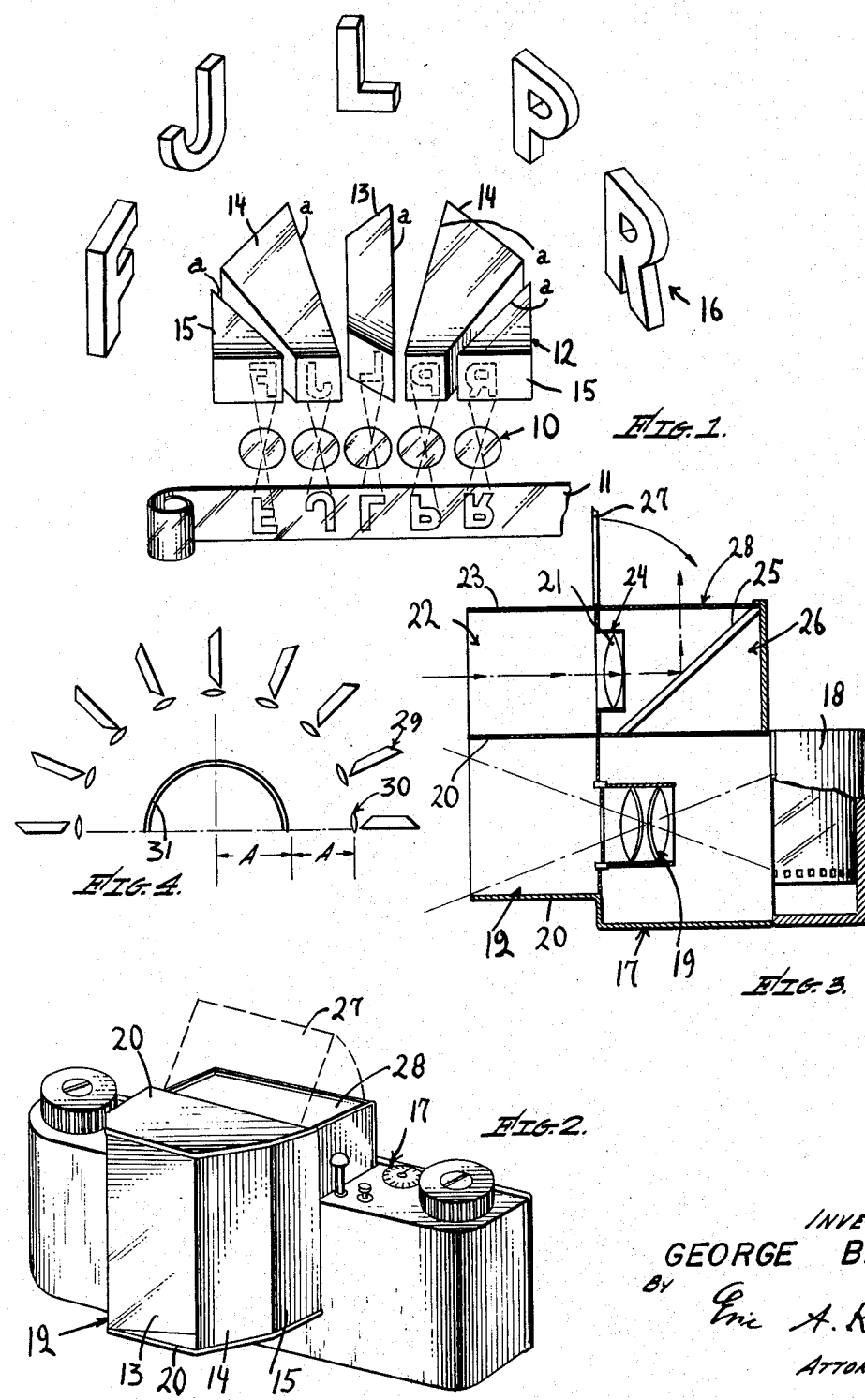
INVENTOR.
GEORGE BAKER
BY
Eric A. Rose
ATTORNEY.

Dec. 10, 1963    G. BAKER    3,113,484
APPARATUS FOR PRODUCING PANORAMIC AND PANORAMIC
STEREOSCOPIC IMAGES
Filed July 29, 1963    3 Sheets-Sheet 2

INVENTOR.
GEORGE BAKER
BY Eric A. Rose
ATTORNEY.

Dec. 10, 1963  G. BAKER  3,113,484
APPARATUS FOR PRODUCING PANORAMIC AND PANORAMIC
STEREOSCOPIC IMAGES
Filed July 29, 1963  3 Sheets-Sheet 3

INVENTOR.
GEORGE BAKER,
BY Eric A. Rose
ATTORNEY.

United States Patent Office 3,113,484
Patented Dec. 10, 1963

3,113,484
APPARATUS FOR PRODUCING PANORAMIC AND PANORAMIC STEREOSCOPIC IMAGES
George Baker, 809 E. Pacific St., Wilmington, Calif.
Filed July 29, 1963, Ser. No. 300,406
1 Claim. (Cl. 88—16.6)

My invention relates to improvements in apparatus for producing panoramic and panoramic stereoscopic images; and the objects of my invention are, first, to provide a novel means for taking and projection of panoramic still and motion pictures using a curved screen; second, to provide a novel means for taking and viewing panoramic stereoscopic pictures reproducing a scene or object substantially as seen by the human eye; third, to provide an arrangement and construction permitting the projection and viewing of panoramic stereoscopic pictures; fourth, to afford facilities for the taking of panoramic and panoramic stereoscopic pictures using a combination multiple lens-erector system; fifth, to provide a construction for the taking and projection of panoramic and panoramic stereoscopic pictures using one film space for the instantaneous taking or projection of such pictures including and taking and projection of a panoramic scene or object of substantially 180 degree scope or larger.

I attain these and other objects by way of the means and construction illustrated in the accompanying drawings in which:

FIGURE 1 is a schematic view in perspective of my invention for the taking and projection of panoramic pictures;

FIGURE 2 is a view in perspective of a camera embodying my invention illustrated in FIGURE 1;

FIGURE 3 is a cross-sectional view taken through the center of a camera embodying the invention illustrated in FIGURE 5;

FIGURE 4 is a diagrammatic view of my invention for the taking and projection of panoramic pictures of substantially 180 degree scope and using a curved film;

Similar numerals refer to similar parts throughout the several views.

The apparatus illustrated in FIGURES 1 and 2 comprise a number of lenses, 10, in horizontal alignment with each other, a continuous film strip, 11, positioned in back of said lenses at a distance of one focal length, and a system of prisms or reflectors, 12, positioned in front of said lenses, 10.

For illustration, as shown in FIGURE 1, I employ a center prism, 13, two intermediate prisms, 14, 14, and two end prisms, 15, 15. One side of each intermediate and end prism is in horizontal alignment substantially parallel to the film strip, 11, and one edge of the center prism is aligned on a vertical plane with one side each of the intermediate and end prisms, hereinabove referred to. The reflecting surface of the prisms or reflectors is indicated by letter "a." All prisms, except the center or "dove" prism, 13, may be replaced by mirrors or other reflectors.

Rays emanating from a subject, 16, strike the reflecting surfaces and are transmitted through the lenses upon the film strip. Interposition of an additional set of mirrors or prisms between the lens system and the film strip will result in the complete erection of the images on the film strip.

It is understood that the lenses may be positioned between the subject, 16, and the prisms or reflectors without affecting the result.

Figure 6:
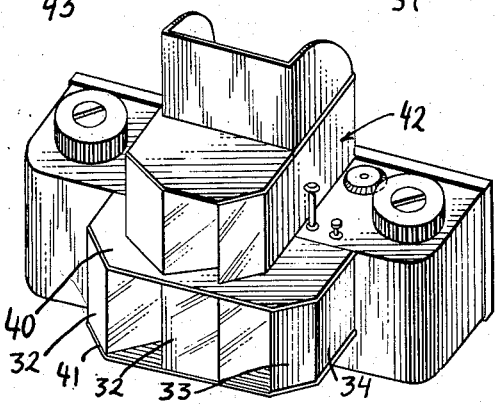
FIGURE 6 is a view in perspective of a camera embodying my invention.

The arrangement and construction illustrated in FIGURE 2 embodies the invention hereinabove described. A camera housing, 17, and film track and storage, 18, comprises a multiple lens system, 19, in horizontal alignment and top and bottom anchor plates, 20, 20, holding the prisms, 12, in fixed spaced relation to each other. The top portion of the camera embodies a viewer comprising a set of lenses, 21, 21, and a separate set of prisms, 22, as illustrated in FIGURES 3 and 6, in fixed spaced relation to each other and anchored between two plates, 20, 23. The lenses are mounted in a suitable frame, 24, and a viewing reflector, 25, is mounted diagonally in the box-like viewer housing, 26, located behind the set of lenses, 21. A hinged cover, 27, is pivotally affixed to the top of the view housing, 26. Above the viewing reflector, 25, a frosted glass plate, 28, encloses the top of the viewer housing, 26. In operation, rays striking the reflecting surfaces of the prisms will pass through the set of lenses and will be deflected by the deflecting plate upon the frosted glass plate producing a continuous panoramic picture. It is understood that this viewer may be used with the camera illustrated in FIGURE 6, and hereinafter described.

If desired, a conventional type viewer may be used with this camera for purposes of economy and simplicity, although such viewer would not extend this picture viewed to the same scope as the panoramic camera.

It is further understood that "right angle" prisms may be used instead of the particular type prisms used in the instant device for purposes of illustration.

Instead of using a flat film track, a curved semi-cylindrical or cylindrical film track may be used having a radius of "one focal length" and being distant "one focal length" from the respective lenses, as illustrated in FIGURE 4 where "A" represents the distance of "one focal length" of the lens system used.

For purposes of illustration five lenses and respective prisms are used, as illustrated in FIGURE 1. Depending upon the number of lenses and respective prisms or reflectors used, the panoramic limitations may either be increased or decreased beyond 180 degree scope.

By the use of a multiple number of "dove" prisms, 29, lenses, 30, and a cylindrical film track, 31, a panoramic view of 180 to 360 degree scope may be photographed or projected. By the use of spherical film track and film, and using prisms of the complete erector type, as for instance two "dove" prisms arranged in a straight line and turned at right angle with respect to each other, or the "Brashear-Hastings" prism, or two porroabbe prisms, a photograph of spherical scope may be taken and projected.

For the purpose of projection, lenses of substantially the same focal length as that of the camera should be used. The camera or projector may be focused by changing the angle of the prisms individually and by changing the distance of the prisms from each other. I prefer a fixed focus length lens small enough to produce a large depth of field. The width of the film to be used in my device is directly related to the focus of the lens system used by way of the formula of 3.1416×focal length of lens system, for an 180 degree panoramic scope.

Figure 5:
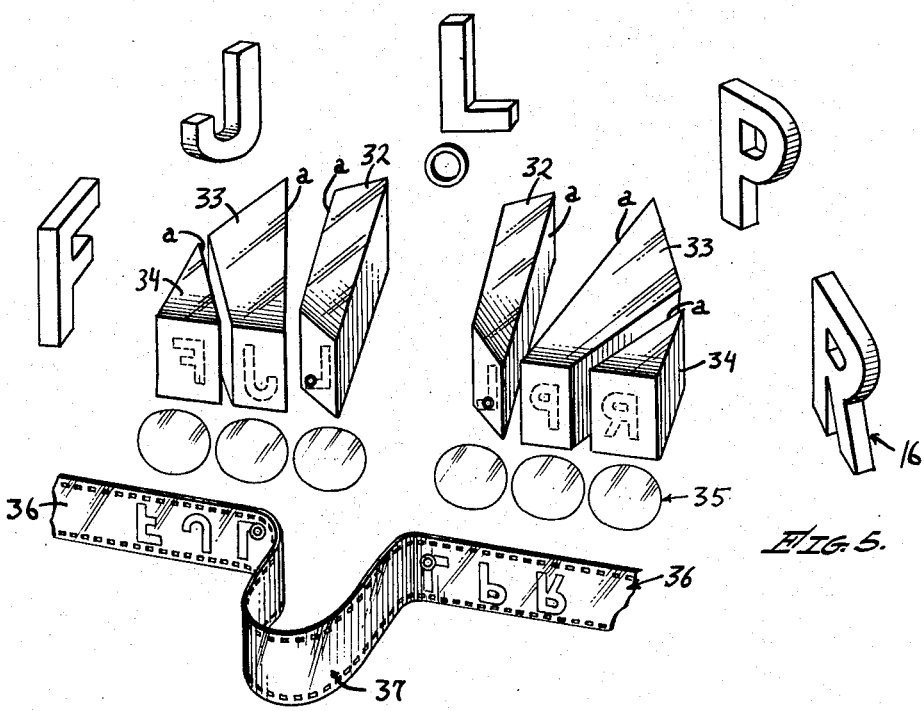
FIGURE 5 is a schematic view in perspective of my invention for the taking of panoramic stereoscopic pictures.

For the purpose of producing a photograph simulating the human eye's panoramic stereoscopic view, I use the means illustrated in FIGURE 5, where for the purpose of obtaining a 180 degree scope, for instance, I use two center "dove" prisms, 32, 32, spaced a predetermined distance apart, two intermediate prisms, 33, 33, and two end prisms, 34, 34. The capital letters F, J, L, P, and R, are arranged in arcuate fashion, and a ring is shown in front of the letter L for the purpose of illustration of the panoramic stereoscopic effect. The rectangular faces of each intermediate and end prism and one short edge of the rectangular reflecting surface of each center prism are aligned in a vertical plane. A set of lenses, 35, 35, is aligned horizontally behind the set of prisms. A flat film track, 36, having a semi-cylindrical extension loop, 37, centered between the two center prisms 32, 32, is spaced at a distance of "one focal length" behind the lenses. The letter "a" indicates reflecting surfaces. Rays emanating from a subject 16, are collected by the reflecting lenses upon the film.

The camera illustrated in FIGURE 6 comprises a substantially rectangular housing for the reception of the camera with conventional type winding mechanism. A viewer housing is mounted on the top of the camera housing and attached to it, as shown in FIGURES 3 and 6.

The camera illustrated in FIGURES 3, 6 and 7 permits the taking of pictures embodying the invention hereinabove outlined. The prisms are arranged as shown in FIGURE 5 and are held in position by top and bottom plates, 40 and 41 respectively.

A system of multiple lenses is located behind the prisms in a conventional multiple lens frame. A conventional type viewer may be attached to the top of the camera, or a panoramic viewer, 42, similar to that illustrated in FIGURES 3 and 6, may be used.

Figure 7:
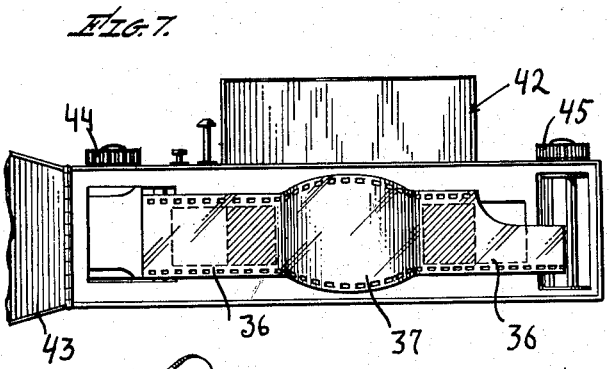
FIGURE 7 is a rear view of the camera illustrated in FIGURE 3 showing the film pressure plate in the open position partly broken away and in section.

As illustrated in FIGURE 7, the film track and mechanism comprises a film pressure plate, 43, hinged in the conventional manner to the back of the camera, a film winder knob and mechanism, 44, a re-winder knob and mechanism, 45, and film track of one frame length each, 36, 36, separated by a cylindrically curved surface, 37, of one frame surface length. The cross-hatched squares illustrated in FIGURE 7 on the film, 36, 36, represent stereoscopic views while the blank squares of the film 36, 36, represent non-stereoscopic views.

Since the size of the perimeter of the film extension loop is one frame, and the two adjacent frames are exposed simultaneously, movement of the film through and over the track at the rate of one frame and three frames alternately will permit the exposure of the entire film roll.

A modified form of my invention designed to produce images of 360 degree scope is illustrated in FIGURES 8 through 12 inclusive.

Figure 8:
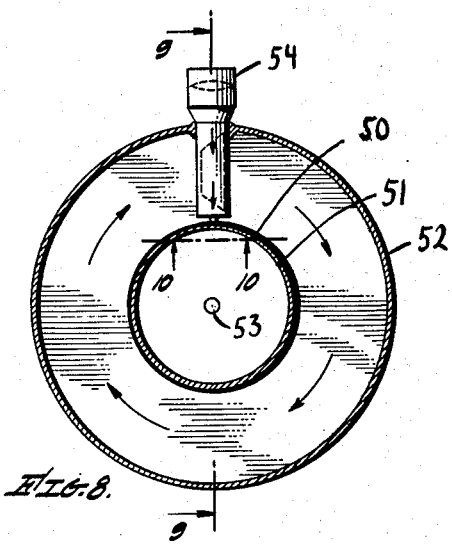
FIGURE 8 is a plan sectional view of an apparatus for the taking and projection of panoramic pictures of 360 degree scope and using a circular film.
Figure 9:
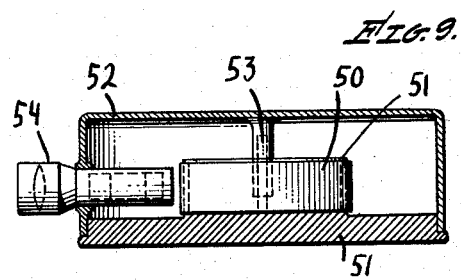
FIGURE 9 is a cross-sectional view of the camera illustrated in FIGURE 8 taken on line 9—9 of FIGURE 8.
Figure 10:
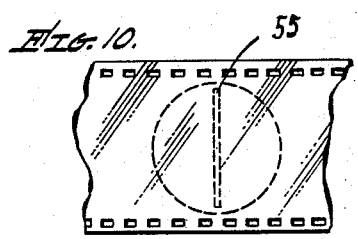
FIGURE 10 is an elevational sectional view of the slot-arrangement of the lens system used in the camera illustrated in FIGURE 8; and taken on line 10—10 of FIGURE 8.

In the still camera illustrated in FIGURES 8, 9 and 10, I employ a cylindrical stationary film track, 60, disposed in the center of a circular base, 51. Circular movable housing, 52, is disposed upon said base, 51, and pivotally attached to the center thereof, 53.

A conventional lens system mounted inside a tubular structure, 54, is horizontally positioned in said movable housing, 52, aligned with the film track, 50. The radius of the film curvature should be one focal length of the lens system used.

The inner end of the tubular structure, 54, is closed and has a slot-like opening, 55, vertically disposed therein, and in alignment with the film track, 50.

Figure 12:
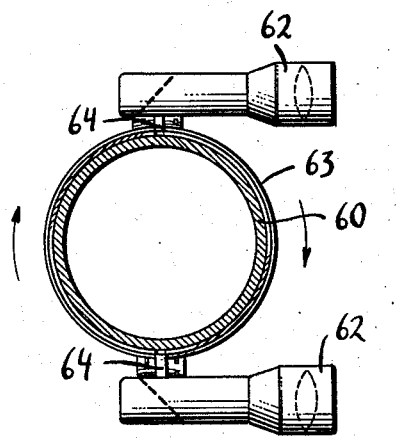
FIGURE 12 is a cross-sectional view of the mechanism illustrated in FIGURE 11 taken on line 12—12 of FIGURE 11.
Figure 11:
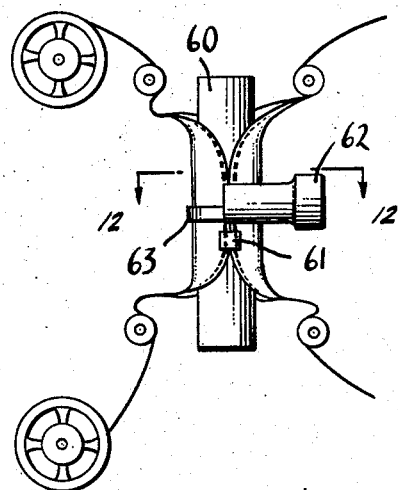
FIGURE 11 is a fragmentary elevational view of the mechanism of a camera for the taking and projection of motion pictures of substantially 180 degree panoramic and steroscopic scope using two lens systems spaced 180 degrees apart.

For the production of motion pictures of 180 degree panoramic and stereoscopic scope, I employ the mechanism illustrated in FIGURES 11 and 12, in which I employ a cylindrical film track, 60, and mechanism, 61, for moving film vertically along said cylindrical film track. Two conventional lens systems enclosed in a tubular structure 62, 62 are spaced 180 degrees apart and mechanically joined by suitable support, 63, permitting it to rotate 180 degrees each for each frame while the film progresses vertically along the cylindrical film track. Conventional driving mechanism, not shown in FIGURES 11 and 12, may be employed to accomplish the rotatable movement of the respective lens structures about each frame while the film progresses vertically along its cylindrical track. A slot-like, 64, 64, opening such as illustrated in FIGURE 10 of the accompanying drawings is provided adjacent to the film and forms a part of the projection mechanism.

A suitable mirror arrangement is provided in the tubular structure of the respective lens systems to deflect rays emanating from a subject and entering the lens systems approximately 90 degrees through said slot-like opening, 64, onto the film.

The film can be projected by the method shown in FIGURE 1 of the accompanying drawings using two devices or using one device and a Polaroid vectograph type film.

While specific forms of my invention have been described, it is understood that the same may be modified without departing from the spirit of my invention.

I claim:

A camera for producing panoramic stereoscopic images comprising two sets of prisms each having a reflecting surface, each set including a center prism, intermediate prisms disposed adjacent to said center prisms, and an end prism disposed adjacent to the respective intermediate prisms, one edge of each reflecting surface being positioned with one edge of each of the other reflecting surfaces in a vertical plane; a system of multiple lenses arranged in a horizontal plane with and behind said prisms, each lens being aligned co-axially with one prism; a film track horizontally aligned with each set of prisms and respective lenses at a predetermined distance therefrom and comprising two horizontally aligned sections of three frame lengths each separated by a semi-cylindrical raised portion having a perimeter of three frame lengths; manually operated means advancing film positioned in said film track at an alternate rate of one and three frame lengths each; a suitable housing enclosing said prisms, lenses and film track; and a viewer disposed about said housing and comprising a plurality of prisms each having a rectangular reflecting surface one short edge of which is so aligned with one short edge of each of the other reflecting surfaces as to form a vertical plane, a multiple lens system disposed in a horizontal plane with said prisms so that each lens is aligned co-axially with one prism, a reflecting plate disposed at a substantially forty-five degree angle with said lenses and at a predetermined distance therefrom, and a translucent plate disposed above said reflecting plate at a substantially forty-five degree angle therewith.

References Cited in the file of this patent

UNITED STATES PATENTS

| | | |
|---|---|---|
| 963,125 | Dyer et al. | July 5, 1910 |
| 1,163,549 | Leonard | Dec. 7, 1915 |
| 1,247,646 | Craig | Nov. 27, 1917 |
| 1,966,092 | Fried | July 10, 1934 |
| 2,045,093 | Newcomer | June 23, 1936 |
| 2,541,699 | Hoad | Feb. 13, 1951 |
| 2,701,503 | Calvi | Feb. 8, 1955 |

FOREIGN PATENTS

| | | |
|---|---|---|
| 282,422 | Great Britain | Oct. 25, 1928 |